(12) United States Patent
Tsujii

(10) Patent No.: US 6,570,150 B2
(45) Date of Patent: May 27, 2003

(54) IMAGE PROCESSING APPARATUS

(75) Inventor: Osamu Tsujii, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 09/750,168

(22) Filed: Dec. 29, 2000

(65) Prior Publication Data

US 2001/0015407 A1 Aug. 23, 2001

(30) Foreign Application Priority Data

Jan. 13, 2000 (JP) ........................................ 2000-004545

(51) Int. Cl.[7] .............................................. G01D 18/00
(52) U.S. Cl. ................................... 250/252.1; 250/553
(58) Field of Search .............................. 250/252.1, 553; 348/187, 180, 241; 358/504, 518

(56) References Cited

U.S. PATENT DOCUMENTS 5,369,261 A * 11/1994 Shamir ........................ 235/469
5,757,425 A * 5/1998 Barton et al. ................ 348/241
6,016,161 A * 1/2000 Robinson .................... 348/187

* cited by examiner

Primary Examiner—Constantine Hannaher
Assistant Examiner—Otilia Gabor
(74) Attorney, Agent, or Firm—Fitzpatrick, Cella, Harper & Scinto

(57) ABSTRACT

An image processing apparatus includes a sensor including a sensing region which senses the image of an object, and a correcting circuit which performs first processing which corrects image data based on a second region corresponding to an irradiation region in the sensing region by using correcting data based on a first region corresponding to another irradiation region in the sensing region, and second processing which performs processing on the image data based on a third region included in the second region, and which is excluded in the overlapping part between the first region and the second region.

19 Claims, 13 Drawing Sheets

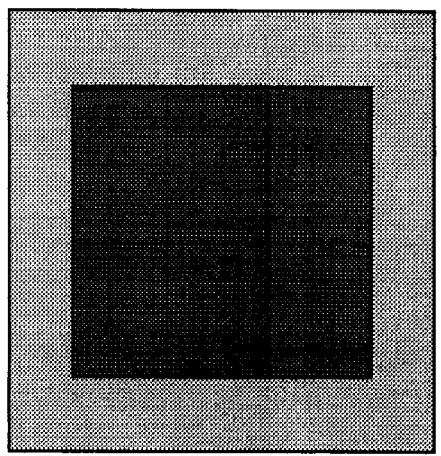
FIG. 3A
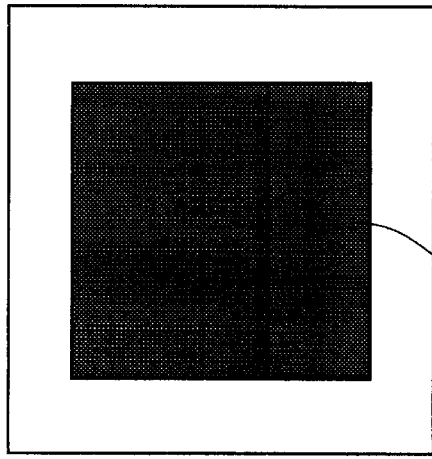
FIG. 3B
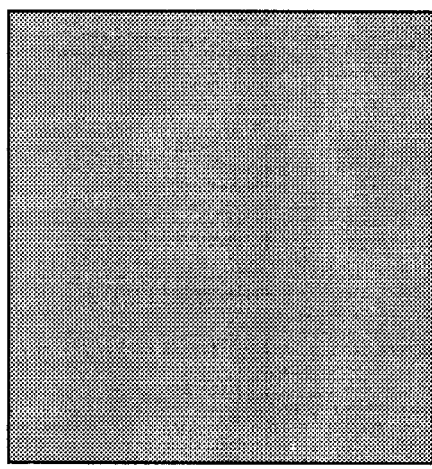
FIG. 3C
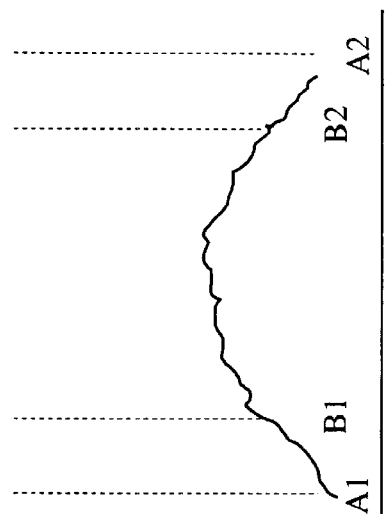

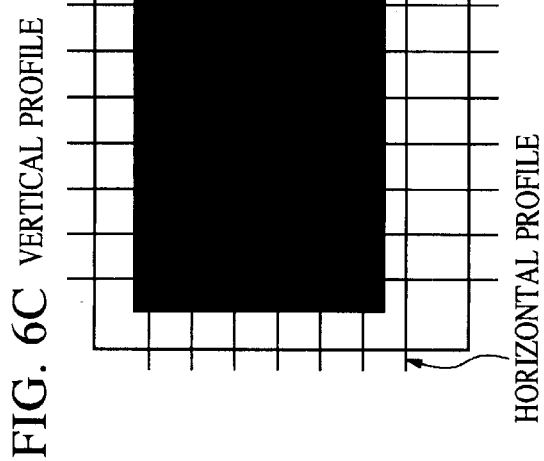
FIG. 6C VERTICAL PROFILE
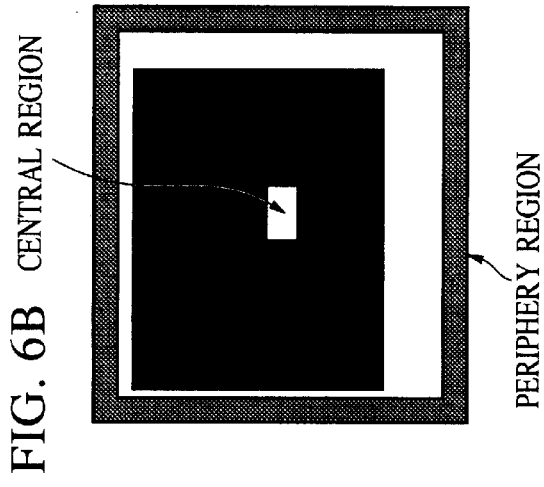
FIG. 6B CENTRAL REGION
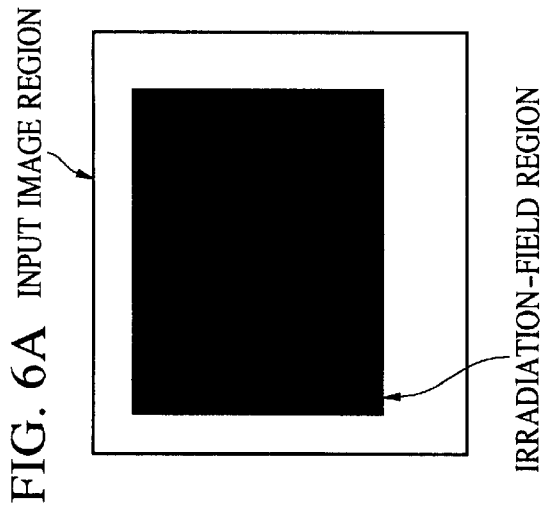
FIG. 6A INPUT IMAGE REGION
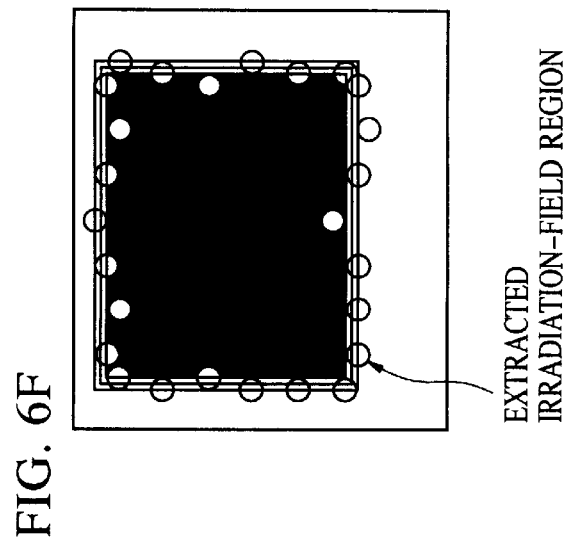
FIG. 6F
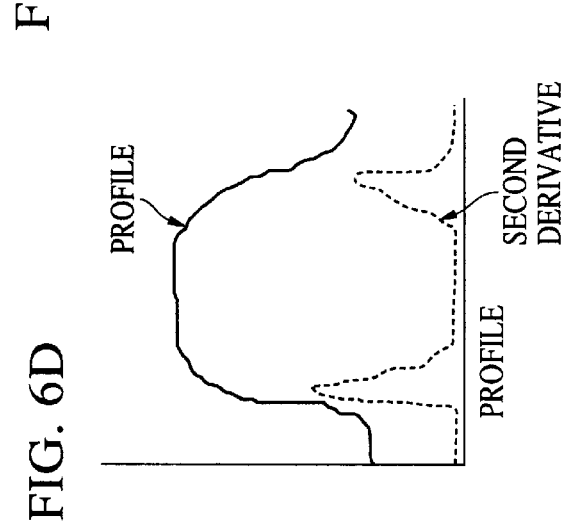
FIG. 6E

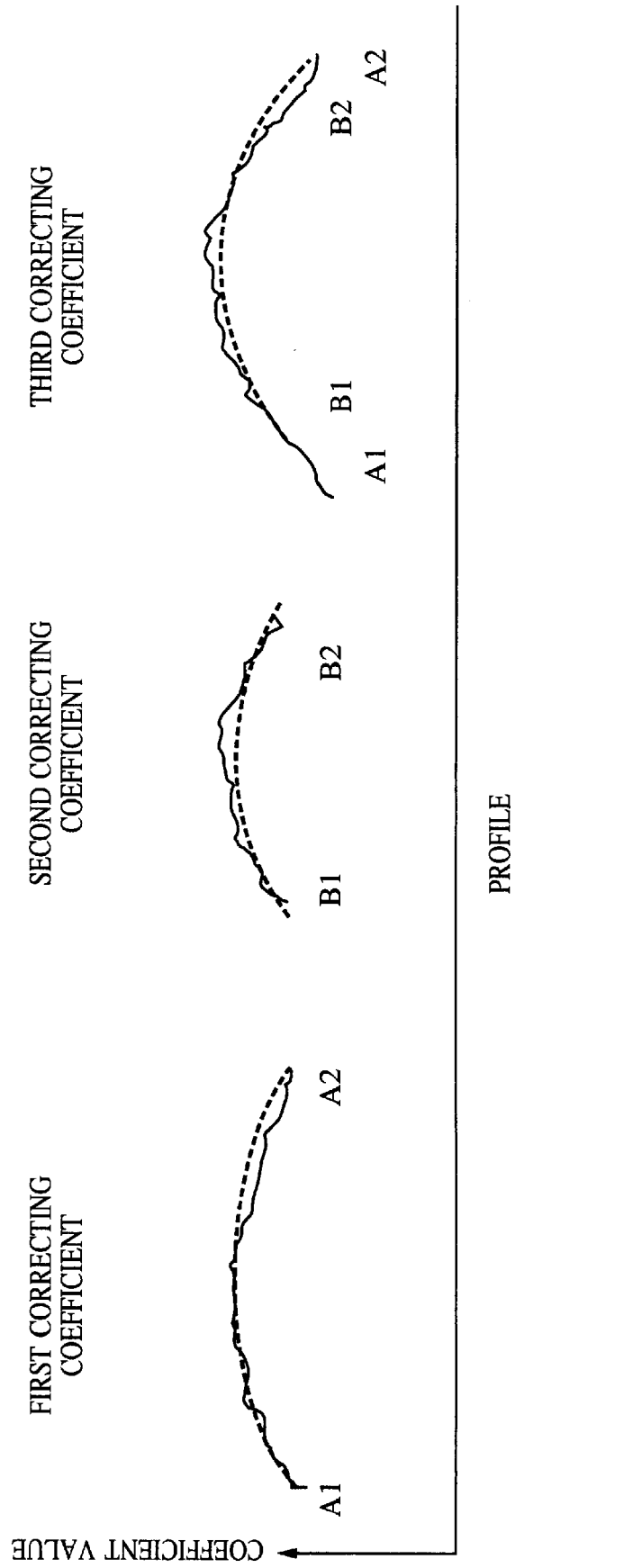

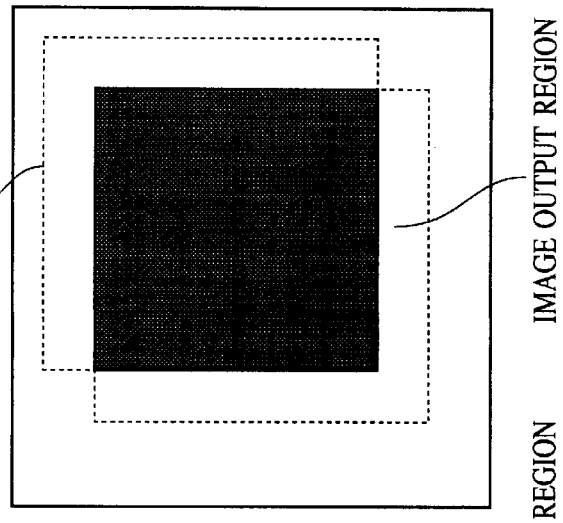
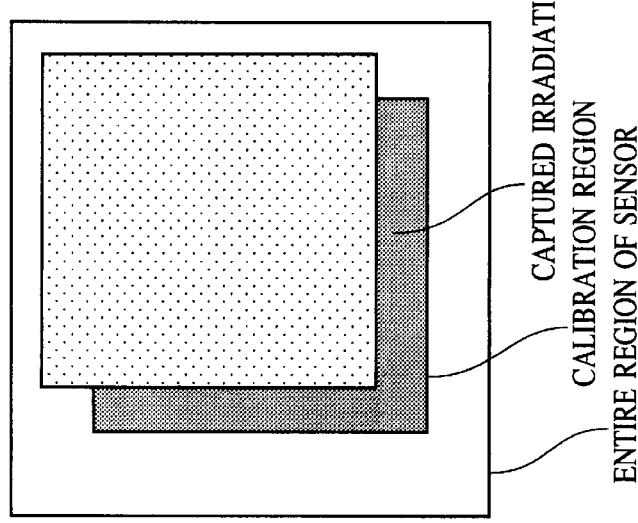
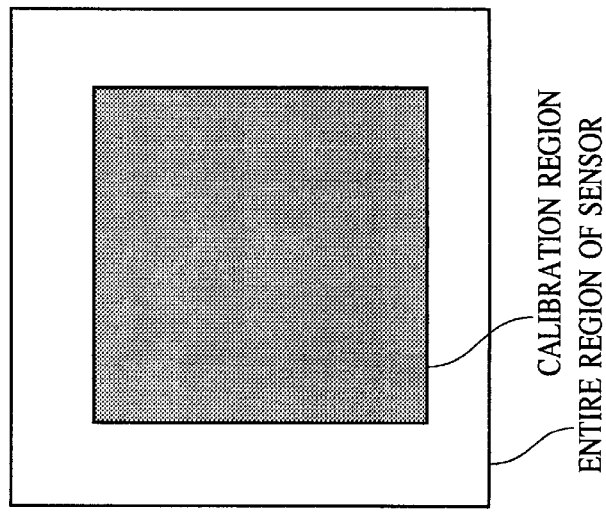

IMAGE PROCESSING APPARATUS

BACKGROUND OF THE INVENTION

1. Field of the Invention

The present invention relates to an image processing apparatus for processing image data output from a sensor, such as a flat panel x-ray sensor, which senses the image of a photographic subject.

2. Description of the Related Art

When radiation rays (x-rays, α rays, β rays, γ rays, electron rays, ultraviolet rays, or the like) irradiate certain phosphors, part of the irradiated energy is absorbed in the phosphors. It is known that by irradiating the phosphors with exciting light such as visible light, the phosphors exhibit photostimulated luminescence in response to the absorbed energy. Phosphors having such a property are called photostimulated phosphors. Radiation image information on a photographic subject such as a human body is temporarily stored in a photostimulated phosphor sheet. By scanning this sheet with exciting light such as a laser beam, photostimulated luminescence is produced. The light due to photostimulated luminescence is photoelectrically read and is converted into an image signal. A radiation image information recording/playback system has been proposed in which a radiation image of the subject is output based on this image signal as a visible image to a recoding material such as a photographic sensitive material or a display device such as a CRT (Cathode-Ray Tube).

Recently, apparatuses have been developed in which an x-ray image is captured using a semiconductor sensor. These apparatuses have a practical advantage over conventional radiography apparatuses using a silver-halide film in that an image can be recorded in a considerably wide radiation exposure range. Specifically, a photoelectrical converter reads x-rays having a very wide dynamic range and converts the x-rays into electrical signals. Based on the electrical signals, the radiation image is output as a visible image to the recording material such as the photographic sensitive material or the display device such as the CRT, whereby a radiation image that is not influenced by variations in the radiation exposure can be obtained.

The semiconductor sensor for sensing the x-ray image has an improved construction having a high resolution of 2000×2500 pixels or above for a 14 inch×17 inch sized image. In the semiconductor sensor having such a wide sensing region, correction of each pixel is required. As the required correction, offset correction and gain correction (shading correction) can be considered. Offset correction can be performed for occurrence of each influence. An art for canceling the offset obtained over the same integration time as that of x-ray irradiation is known. On the other hand, concerning gain correction, a gain-correcting coefficient is computed by establishing an image, as a white image, obtained by irradiating x-rays without any subject to be examined. The need to frequently capture this image significantly reduces the working efficiency. Accordingly, a pre-captured gain-correcting coefficient may be used over a long period such as one week, one month, or one year. However, in view of temperature variation and deterioration over time of the sensor characteristics, frequent capture is desirable.

Capturing sometimes takes place in a state in which the sensor and the focus of the x-rays are disposed in proximity to each other. For example, in the case of x-raying bones, the distance between the sensor and the focus of the x-rays is 1 m. When a typical x-ray apparatus irradiates x-rays at 12 degrees and when the distance between the sensor and the, focus of the x-rays is 1 m, since the sensing region of the sensor is an area of 43×43 cm, irradiation cannot cover the entirety of the sensing region.

When the image of the subject is sensed under the above conditions and when correcting data is obtained, it is desirable that a correcting image be obtained by irradiating the x-rays while maintaining the above distance.

However, no appropriate correcting method of the image of the subject under the above conditions is known.

SUMMARY OF THE INVENTION

Accordingly, it is an object of the present invention to provide an image processing apparatus for appropriately correcting the image of a subject when capturing is performed in a state in which the focus of radiation rays, such as x-rays, and a sensor are disposed in proximity to each other.

To this end, according to a first aspect of the present invention, there is provided an image processing apparatus comprising a sensor including a sensing region which senses the image of an object, and a correcting circuit which performs first processing which corrects image data based on a second region corresponding to an irradiation region in the sensing region by using correcting data based on a first region corresponding to an irradiation region in the sensing region, and second processing which performs processing on the image data based on a third region included in the second region, and excluded in the overlapping part between the first region and the second region.

According to a second aspect of the present invention, an image processing apparatus comprises a sensor including a sensing region which senses the image of an object, and a correcting circuit which corrects image data based on a second region corresponding to an irradiation region in the sensing region by using correcting data based on a first region which corresponds to an irradiation region in the sensing region and which is smaller than the sensing region.

According to a third aspect of the present invention, an image processing apparatus comprises a sensor including a sensing region which senses the image of an object, and a correcting circuit which corrects image data based on a second region corresponding to an irradiation region in the sensing region by using correcting data based on a first region corresponding to an irradiation region in the sensing region, wherein the correcting circuit corrects the image data based on the fact that the irradiation region in the sensing region is smaller than the sensing region.

According to a fourth aspect of the present invention, an image processing apparatus comprises a sensor including a sensing region which senses the image of an object, a correcting circuit which corrects image data based on a second region corresponding to an irradiation region in the sensing region by using correcting data based on a first region corresponding to an irradiation region in the sensing region, and a recognizing unit which recognizes the irradiation region in the sensing region, wherein the correcting circuit corrects the image data based on the recognition result from the recognizing unit.

According to a fifth aspect of the present invention, an image processing apparatus comprises a sensor including a sensing region for sensing the image of an object, and a correcting circuit which corrects image data from the sensing region by using correcting image data based on first correcting image data and second correcting image data from the sensing region, wherein the first correcting image data and second correcting image data are obtained by different image pick up conditions.

According to a sixth aspect of the present invention, there is provided an image data correcting method for correcting image data output from a sensor including a sensing region which senses the image of an object. The image data correcting method includes correcting image data based on a second region corresponding to an irradiation region in the sensing region by using correcting data based on a first region corresponding to an irradiation region in the sensing region, and performing image processing on the image data based on a region included in the second region and excluded in the overlapping part between the first region and the second region.

According to a seventh aspect of the present invention, the image data correcting method includes correcting image data based on a second region corresponding to an irradiation region in the sensing region by using correcting data based on a first region which corresponds to an irradiation region in the sensing region and which is smaller than the sensing region.

According to an eighth aspect of the present invention, the image data correcting method includes correcting image data based on a second region corresponding to an irradiation region in the sensing region based on the fact that the irradiation region in the sensing region is smaller than the sensing region by using correcting data based on a first region corresponding to an irradiation region in the sensing region.

According to a ninth aspect of the present invention, the image data correcting method includes recognizing an irradiation region in the sensing region, and correcting image data based on a second region corresponding to the irradiation region in the sensing region based on the recognition result of the recognizing by using correcting data based on a first region corresponding to an irradiation region in the sensing region.

According to a tenth aspect of the present invention, an image data correcting method includes correcting image data from the sensing region by using correcting image data based on first correcting image data and second correcting image data from the sensing region, wherein the first correcting image data and second correcting image data are obtained by different image pick up conditions.

According to an eleventh aspect of the present invention, there is provided a computer-readable storage medium containing a program for correcting image data output from a sensor including a sensing region which senses the image of an object. The program includes a first correcting code which corrects image data based on a second region corresponding to an irradiation region in the sensing region by using correcting data based on a first region corresponding to an irradiation region in the sensing region, and a second correcting code which performs image processing on the image data based on a region included in the second region, and excluded in the overlapping part between the first region and the second region.

Further objects, features and advantages of the present invention will become apparent from the following description of the preferred embodiments with reference to the attached drawings.

BRIEF DESCRIPTION OF THE DRAWINGS

FIGS. 3A to 3C show illustrations for the first embodiment;

FIGS. 6A to 6F are illustrations for the first and second embodiments;

FIG. 7 is an illustration for the first and second embodiments;

FIGS. 9A to 9C are illustrations for the second embodiment;

DESCRIPTION OF THE PREFERRED EMBODIMENTS (First Embodiment)

Figure 1:
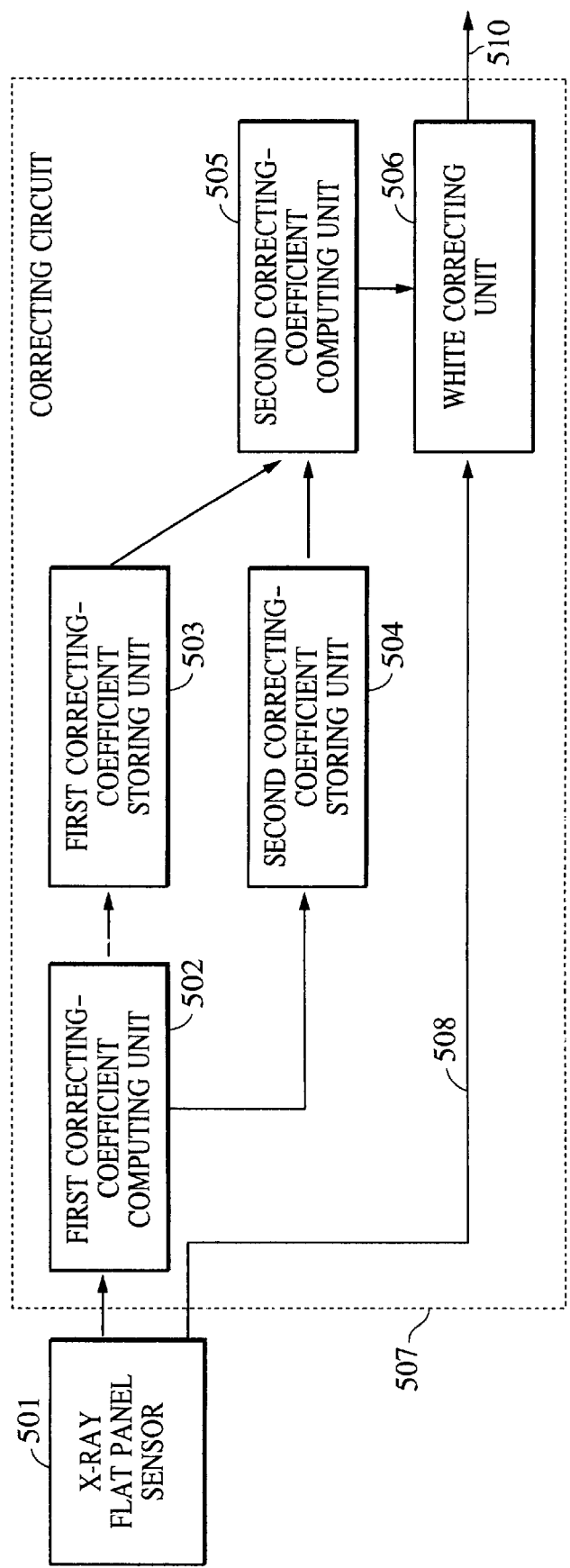
FIG. 1 is a block diagram of an image processing apparatus according to a first embodiment of the present invention.

FIG. 1 shows the main construction of an image processing apparatus according to the first embodiment of the present invention.

A flat panel x-ray sensor 501 serves to visualize the distribution on x-rays that penetrate a patient (a photographic subject). In this embodiment, the flat panel x-ray sensor 501 uses an amorphous sensor.

As correcting methods for a semiconductor sensor such as the flat panel x-ray sensor 501, offset correction and white correction (gain correction and shading correction) can be considered. Here, the white correction is described. White correction is normally performed as follows. When no subject to be examined is provided in the focus of the x-rays and on the flat panel x-ray sensor 501, the x-rays are irradiated on the flat panel x-ray sensor 501. Irradiation causes a correcting image (correcting data) to be output from the sensor 501. Using this correcting data, image data output from the sensor 501 is corrected. When capturing is performed for obtaining the correcting image and when capturing is performed on a table or when special capturing is performed, a worktop or a slit is sometimes inserted between the focus of the x-rays and the flat panel x-ray sensor 501.

A correcting circuit 507 corrects the image using the correcting image output from the flat panel x-ray sensor 501.

Operation of the image processing apparatus according to the present embodiment is described with reference to FIG. 1.

When the image processing apparatus according to the present invention is used in a hospital, there are some cases in which the correcting image across the entirety of a sensing region 8 (see FIG. 13) of the sensor 501 cannot be captured. Accordingly, in a factory, correction data across the entirety of the sensing region 8 is obtained before shipment. A first correcting-coefficient computing unit 502 computes an initial correcting coefficient and a first correcting-coefficient storing unit 503 stores the initial correcting coefficient. The initial correcting coefficient stored in the first-coefficient storing unit 503 is used as a first correcting coefficient. In view of temperature variation and deterioration over time, it is desirable that correction data be frequently obtained. Therefore, in the hospital, correction data is obtained for a sub-region of the sensing region 8 of the sensor 501 that is irradiated by x-rays. The first correcting-coefficient computing unit 502 computes an additional correcting coefficient and a second correcting-coefficient storing unit 504 stores the additional correcting coefficient. The additional correcting coefficient stored in the second correcting-coefficient storing unit 504 is used as a second correcting coefficient. The first and second correcting coefficients cannot be simply combined together due to differences in shading of x-rays. A second correcting-coefficient computing unit 505 computes an approximation function for each correcting image which is represented with a corresponding polynomial. The first correcting coefficient is combined with the second correcting coefficient to form a third correcting coefficient. A white correcting unit 506 performs correction of the image data output on line 508 from the sensor 501 using the third correcting coefficient.

Details of the image processing shown in FIG. 1 are described below.

Figure 2:
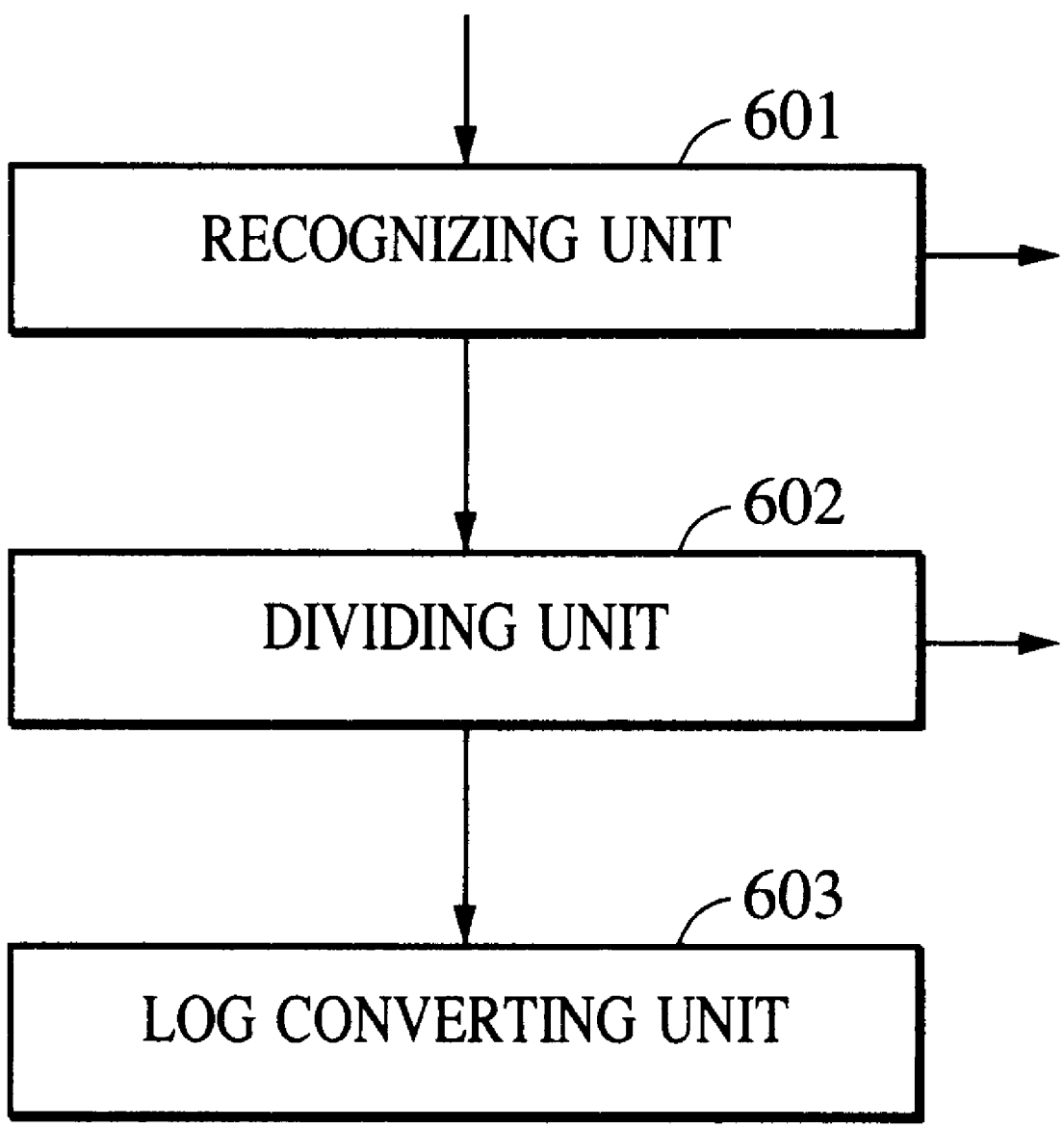
FIG. 2 is a block diagram illustrating the first embodiment and a second embodiment.

The correcting image output from the sensor 501 is sent to the first correcting-coefficient computing unit 502. As shown in FIG. 2, the first correcting-coefficient computing unit 502 includes a recognizing unit 601, a dividing unit 602, and a LOG converting unit 603.

Figure 4:
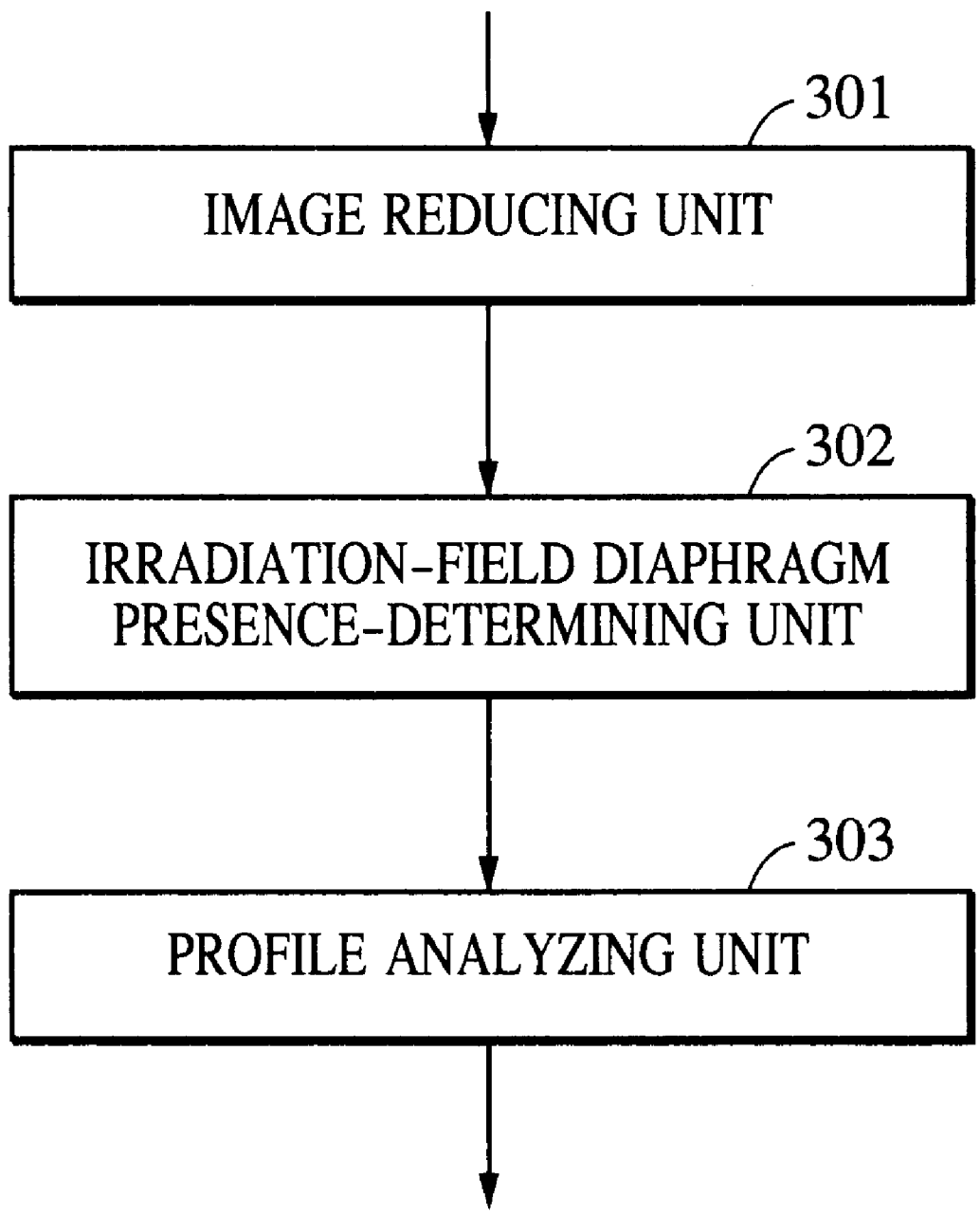
FIG. 4 is a block diagram illustrating the first and second embodiments.

As shown in FIG. 4, the recognizing unit 601 includes an image reducing unit 301, an irradiation-field diaphragm-presence determining unit 302, and a profile-analyzing unit 303. The image reducing unit 301 outputs a reduced image having approximately 336×336 pixels based on an input image having 2688×2688 pixels. For reducing the computations in the subsequent stages, original 12-bit image data may be converted into 8-bit image data by removing the lower four-bits thereof.

The irradiation-field diaphragm-presence determining unit 302 obtains the distribution on the x-ray irradiation region on the entirety of an input image region. The x-ray irradiation region is sometimes distributed throughout the entirety of the input image, whereas x-rays sometimes irradiate a part of the input image, which means that the irradiation field diaphragm exists. The determining unit 302 determines the presence of the irradiation field diaphragm. FIG. 6A shows an example image.

When the irradiation-field diaphragm exists, since there is a part of the periphery of the image experiencing no x-ray irradiation, the average pixel value of the peripheral region of the input image and that of the central region of the input image are compared. On the basis of experience, if the average pixel value of the peripheral region of the input image is below five percent of the average pixel value of the central region, then the irradiation-field diaphragm can be determined to exist. FIG. 6B shows an example of the peripheral region and the central region.

When the irradiation-field diaphragm exists, the profile analyzing unit 303 vertically and horizontally extracts some profiles. Two peaks are extracted by taking second derivatives of an extracted profile. In this manner, the coordinates of the peak values are obtained by taking second derivatives of a plurality of profiles, whereby the lines of the irradiation-field region can be obtained. FIG. 6C shows an example of profile locations; FIG. 6D shows an example of second derivative peak extraction; FIG. 6E shows the extracted location of each profile; FIG. 6F shows a determined irradiation-field region. The irradiation-field region can be stored as four linear functions obtained by approximating the irradiation-field region to a rectangle or as a two-dimensional bitmap, which serves as a mask image.

The dividing unit 602 computes the average pixel value $V_a$ of central pixels (approximately 32×32 pixels) of the extracted irradiation-field region and then computes $V1=V/V_a$ with respect to a pixel value V within an irradiation-field region A1 of the correcting image. Using the resultant values, the pixel gain and shading of the x-ray source can be corrected. Specifically, a constant K is multiplied by the value obtained by the above division and then the resultant value is stored as data having an effective bit length of 16 bits. The LOG converting unit 603 performs LOG conversion on the correcting coefficient for the irradiation-field region A1 of the correcting image. When LOG conversion is performed, the correcting coefficient is compressed into 12-bit data.

The correcting coefficient and irradiation-field region information of the correcting image for the irradiation-field region A1 of the first correcting image are stored in the first correcting coefficient storing unit 503. In the present embodiment, since the first correcting image is assumed to be captured with no irradiation-field diaphragm before shipment, the irradiation-field region covers the entire area of the sensor 501. However, the present invention is not limited to this assumption.

The second correcting image which is captured at the hospital is described. A second correcting-coefficient is computed using the first correcting-coefficient computing unit 502 in the same manner as the first correcting-coefficient. The second correcting-coefficient differs from the first correcting-coefficient in that the area of the irradiation-field region is limited. FIG. 3A shows the first correcting coefficient and FIG. 3B shows the second correcting coefficient, respectively. Profiles of parts indicated by lines are shown at the corresponding lower parts of FIGS. 3A and 3B. There may be differences among x-ray processing apparatuses to be used or among the appearances of shadings having different distances between the foci of the x-rays and the corresponding sensors. When the second correcting coefficient for an irradiation-field region A2 of the second correcting image is computed, the dividing unit 602 computes $V2=V/V_a$.

Figure 5:
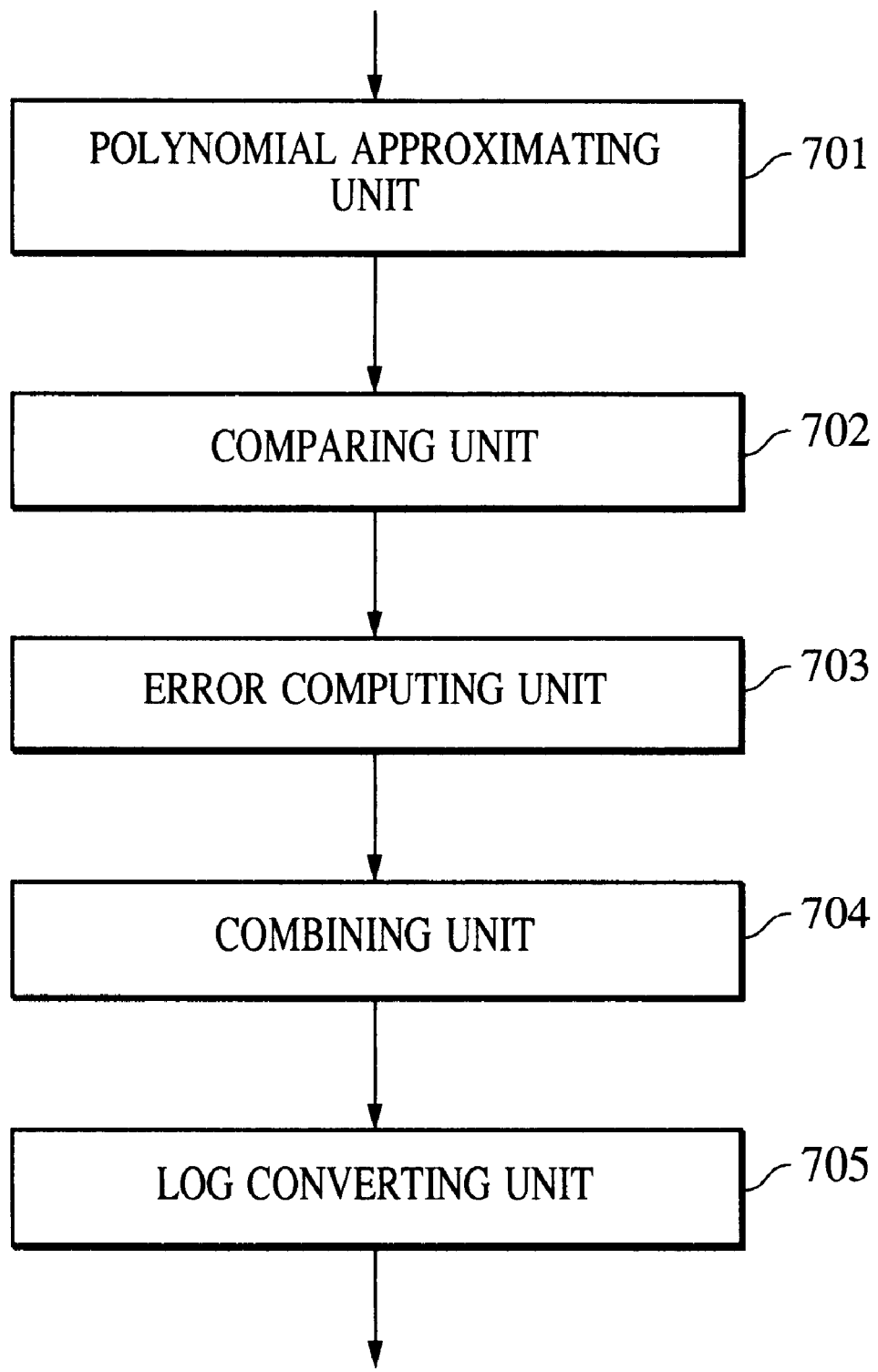
FIG. 5 is a block diagram illustrating the first embodiment.

The second correcting-coefficient computing unit 505 shown in detail in FIG. 5 is now described. The second correcting-coefficient computing unit 505 includes a polynomial approximating unit 701, a comparing unit 702, an error computing unit 703, a combining unit 704, and a LOG converting unit 705. The polynomial approximating unit 701 computes polynomials F1(X, Y) and F2(X, Y) with respect to a first correcting coefficient V1(X, Y) and a second correcting coefficient V2(X, Y), respectively. Specifically, each coefficient of the polynomials is computed using a least squares method in which $F1(X, Y)=aX^2+bY^2+cXY+dX+eY+f$ and $F2(X, Y)=sX^2+tY^2+uXY+vX+wY+z$. Although quadratic functions are used, cubic functions or functions of a higher order may be used.

The comparing unit 702 compares the sizes of the irradiation-field regions A1 and A2. Although the region A2 is a part of the region A1 in the present embodiment, this is not necessary. When the irradiation region is stored as the bitmap, comparison is performed by recognizing the region as the image. When the irradiation region is stored as line data, comparison is performed by recognizing the region as line data. A third correcting coefficient is determined based on the region A2 and the external part of the region A2 is determined as an adjoining part.

The error computing unit 703 is now described. Since V2 is used as a reference correcting coefficient, an error with respect to the outside of the region A2 is computed. When an irradiation-field region obtained by excluding the region A2 from the region A1 is used as A3, F1(X, Y) with respect to the region A3 is computed and an error D(X, Y) between the resultant F1(X, Y) and the first correcting coefficient V1(X, Y) is found.

D(X, Y)=V1(X, Y)/F1(X, Y) where (X, Y) is in the region A3.

By applying the polynomial F2(X, Y) to the region A3, the computation result of F2(X, Y) and the error D(X, Y) is used as a third correcting coefficient V33 for the region A3.

V33(X, Y)=D(X, Y)×F2(X, Y) where (X, Y) is in the region A3.

A correcting coefficient V32 for the irradiation-field region A2 is established as follows. V32(X, Y)=V2(X, Y) where (X, Y) is in the region A2.

Basically, combining processing is completed in the above-described manner. However, step artifacts may occur between the seams of the correcting coefficients. Hence, the combining unit 704 handles such artifacts. The combining unit 704 computes S32 and S33 that are summations of V32(X, Y) and V33(X, Y), respectively, with respect to the pixel values of the outer periphery of the irradiation-field region A2.

S32=ΣV32(X, Y) where (X, Y) is in the outer periphery of the region A2.

S33=ΣV33(X, Y) where (X, Y) is in the outer periphery of the region A2.

When S32 is equal to S33, it can be determined that the correcting coefficients are combined without any step. D3 is obtained as follows.

D3=(S32−S33)/the number of the outer peripheral pixels of the region A2.

Combining processing is performed for finding a final combined correcting coefficient V3 obtained by adding D3 to V33.

V3(X, Y)=V33(X, Y)+D3 where (X, Y) is in the region A3. A correcting coefficient for the irradiation-field region A2 is obtained as follows. V3(X, Y)=V32(X, Y) where (X, Y) is in the region A2. The LOG converting unit 705 LOG-converts the above correcting coefficients into the final correcting coefficient. In the present embodiment, a captured image is corrected by causing the white correcting unit 506 to subtract the third correcting coefficient from the basic image data which has undergone offset correction and LOG conversion. FIG. 7 shows appearances of combining parts between the approximation functions and the correcting coefficients. In FIG. 7, points A1 and A2 represent the end points of the first correcting coefficients, respectively. Points B1 and B2 represent the end points of the second correcting coefficient, respectively. The solid lines represent the actual correcting coefficients and the dashed lines represent the curves of the approximation functions.

(Second Embodiment)

Figure 8:
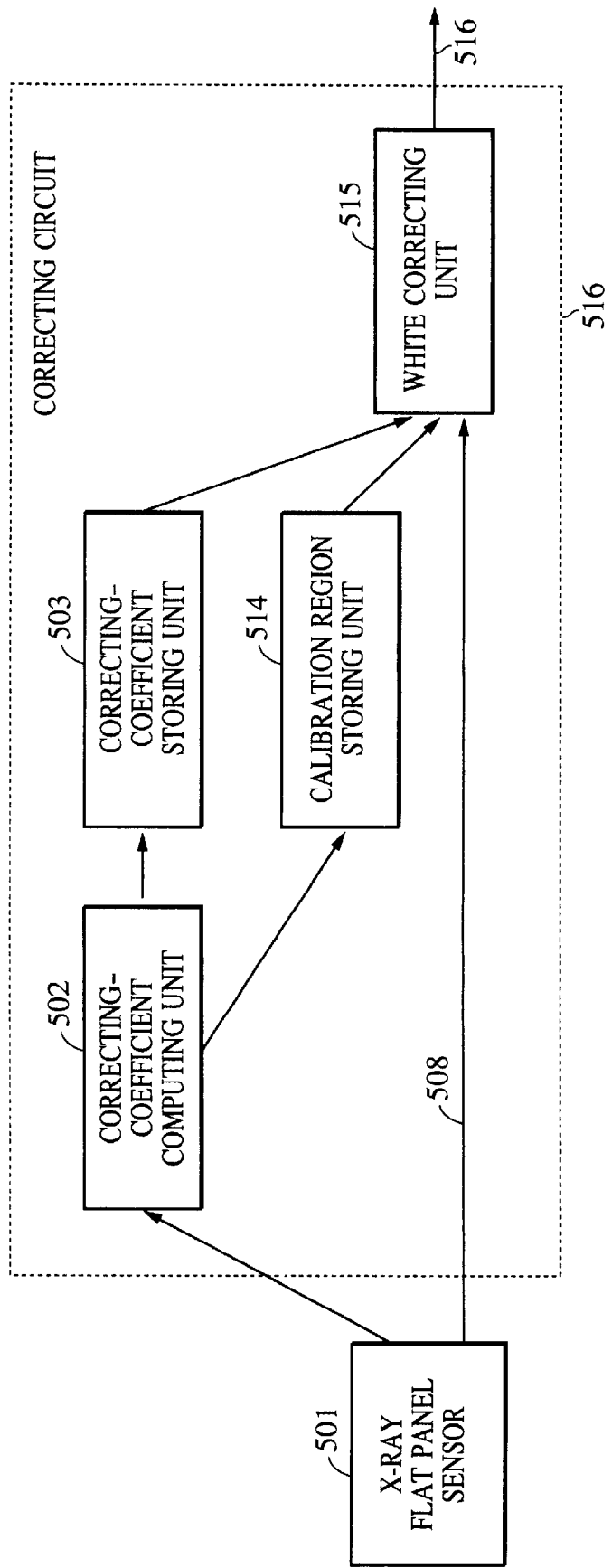
FIG. 8 is a block diagram illustrating the second embodiment.

FIG. 8 shows a main component construction of the image processing apparatus according to the second embodiment of the present invention.

The flat panel x-ray sensor 501 is the same sensor described in the first embodiment.

A correcting circuit 516 corrects the image using the correcting image output from the flat panel x-ray sensor 501.

Operation of the image processing apparatus according to the present embodiment is described with reference to FIG. 8.

The correcting image (correcting data) is output from the irradiation region of the sensing region 8 of the flat panel x-ray sensor 501. The correcting-coefficient computing unit 502 (equivalent to the first correcting-coefficient computing unit 502 in the first embodiment) computes the correcting coefficient using the output correcting image. The correcting coefficient storing unit 503 (equivalent to the first correcting coefficient storing unit 503 in the first embodiment) stores the resultant correcting coefficient therein. A calibration-region storing unit 514 stores irradiation-field region data indicative of the region irradiated on the sensor 501 when computing the correcting coefficient was computed. The image data output on line 508 from the sensor 501 is corrected and output to the correcting circuit 516 so that, based on information from the correcting-coefficient storing unit 503 and the calibration region storing unit 514, only the overlap part between an irradiation region for obtaining the correcting image and an irradiation region for obtaining the image data is corrected and so that the image data excluding the overlapping part is not output as the corrected image.

Details of the image processing apparatus in FIG. 8 are described below.

The correcting image output from the flat panel x-ray sensor 501 is sent to the correcting-coefficient computing unit 502. As shown in FIG. 2, the correcting-coefficient computing unit 502 includes the recognizing unit 601, the dividing unit 602, and the LOG converting unit 603.

The recognizing unit 601 has the same construction as the recognizing unit 601 in the first embodiment.

The recognizing unit 601 obtains the distribution on the x-ray irradiation region to the entirety of the input image region. In some cases, the x-ray irradiation region is distributed over the entirety of the input image, but in other cases x-ray irradiation region is distributed partly in which case an irradiation-field diaphragm exists. The determining unit 302 determines presence of the irradiation field diaphragm. FIG. 6A shows an example image.

When the irradiation-field diaphragm exists, since there is a part of the periphery of the image in which no x-ray irradiates, the average pixel value of the peripheral region of the input image and that of the central region of the input image are compared. On the basis of experience, if the average pixel value of the peripheral region of the input image is below five percent of the average pixel value of the central region, then the irradiation-field diaphragm can be determined to exist. FIG. 6B shows an example of the peripheral region and the central region.

When the irradiation-field diaphragm exists, the profile analyzing unit 303 (FIG. 4) vertically and horizontally extracts some of the profiles. Two peaks are extracted by taking second derivatives of the extracted profile. In this manner, the coordinates of the peak values are obtained by taking second derivatives of a plurality of profiles, whereby the lines of the irradiation-field region can be obtained. FIG. 6C shows an example of profile locations; FIG. 6D shows an example of second derivative peak extraction; FIG. 6E shows the extracted location of each profile; FIG. 6F shows the determined irradiation-field region. The irradiation-field region can be stored as four linear functions obtained by approximating the irradiation-field region into a rectangle or as a two-dimensional bitmap, which serves as a mask image. The calibration region storing unit 514 stores irradiation region information of the correcting image therein.

The dividing unit 602 computes the average value $V_a$ of central pixels (approximately 32×32 pixels) of the extracted irradiation-field region and then computes $V/V_a$ with respect to a pixel value V within the irradiation-field region $A_c$ of the correcting image. Using the resultant values, the pixel gain and shading of the x-ray source can be corrected. Specifically, a constant K is multiplied to the value obtained by the above division and the resultant value is stored as data having an effective bit length of 16 bits.

The LOG converting unit 603 performs LOG conversion on the correcting coefficient for the irradiation-field region $A_c$ of the correcting image. This LOG conversion causes the correcting coefficient to be compressed into 12-bit data. The resultant data is stored in the correcting-coefficient storing unit 503.

Operation of the white correcting unit 515 for correcting the image of a captured subject to be examined is now described. Initially, the relationship between the correcting image and the irradiation region of the subject image is described with reference to FIGS. 9A to 9C. FIG. 9A shows a calibration region. Only a part of the central region of the entire sensor region serves as a capture region of the correcting image. FIG. 9B shows a capture irradiation-field region of the subject image. As shown in FIG. 9B, the two irradiation-field regions do not entirely overlap. Accordingly, the entirety of the image of the subject cannot be white-corrected. The overlap part of the two images (as shown in FIG. 9C) can be corrected and output. Since an operator finds it inconvenient that only the correctable image region among the capture region of the subject image is shown, the outline of the irradiation-field region may be displayed as shown with dashed lines in FIG. 9C. Alternatively, apart from display of the outline, a message may be output that a part of the image region is not shown due to the relations with the correcting image.

Figure 10:
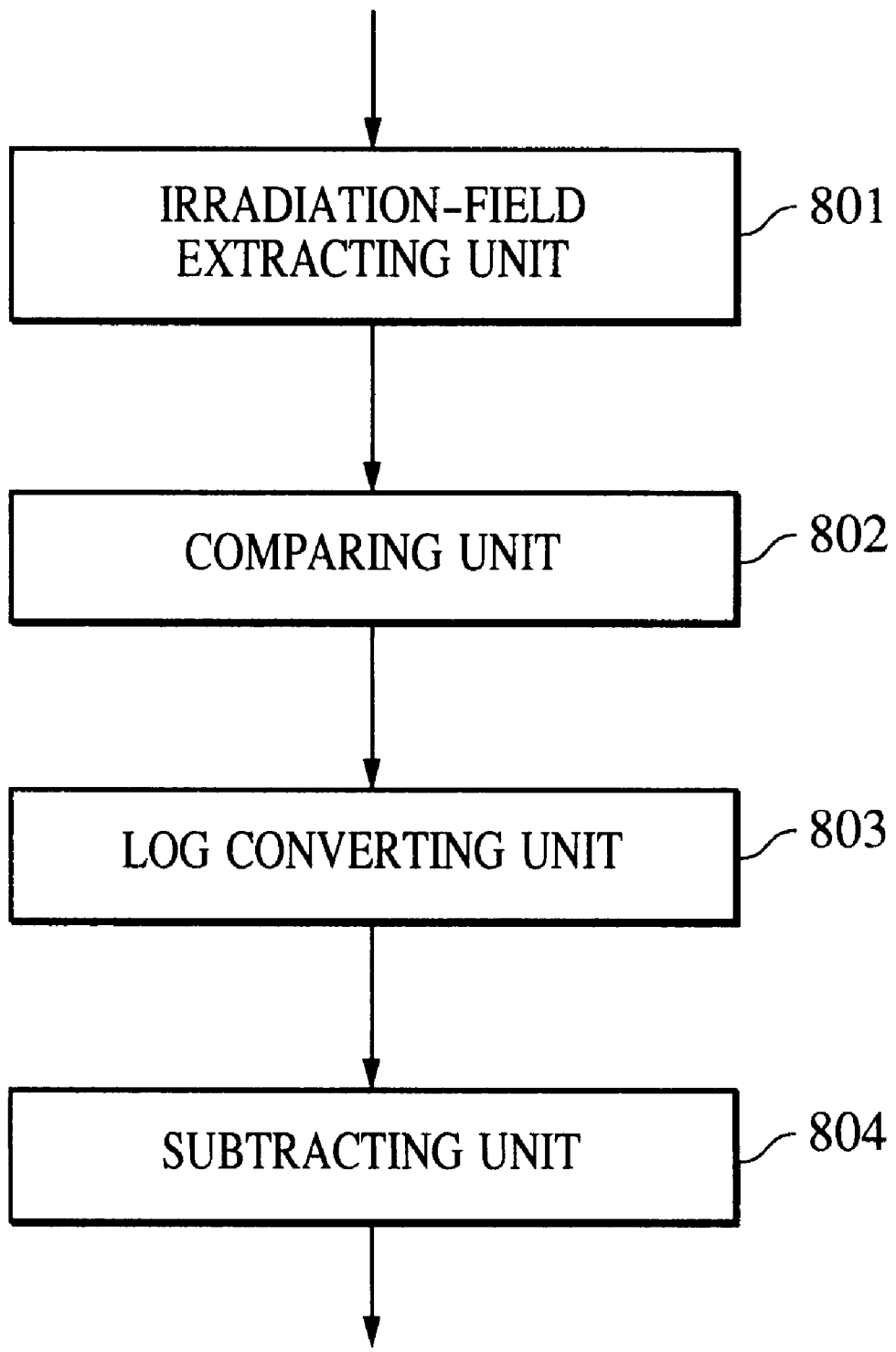
FIG. 10 is a block diagram illustrating the second embodiment.

As shown in FIG. 10, the white correcting unit 515 includes an irradiation-field extracting unit 801, a comparing unit 802 for comparing the calibration region (correcting image) and the subject image, a LOG converting unit 803, and a subtracting unit 804. The irradiation-field extracting unit 801 performs substantially the same processing as the recognizing unit 601. The irradiation-field extracting unit 801 can obtain linear functions of the outline of the irradiation-field region by performing averaging processing on extracted points, although the peak values of the second derivatives may be sensed at edge parts of the subject because the subject is captured in the irradiation-field region.

The comparing unit 802 compares the calibration region (correcting image) and the subject image, and determines a region in which the correcting coefficient is stored in the irradiation-field region of the subject image. This region is determined by performing computation using the linear functions which represent the outline or by performing AND processing on the two-dimensional bitmaps which represent the corresponding irradiation-field regions.

The LOG converting unit 803 performs LOG-conversion on the image output region determined by the comparing unit 712 and then the subtraction unit 804 performs subtraction processing on the resultant image, whereby the output image is determined. When an image output device (not shown) outputs the output image, frequency-emphasizing processing, gradation-changing processing, and the like are performed on the output image.

In the first embodiment, the correcting circuit 507 is constituted by the first correcting-coefficient computing unit 502, the first correcting-coefficient storing unit 503, the second correcting-coefficient storing unit 504, the second correcting-coefficient computing unit 505, and the white correcting unit 506. In the second embodiment, the correcting circuit 516 is constituted by the correcting-coefficient computing unit 502, the correcting-coefficient storing unit 503, the calibration-region storing unit 514, and the white correcting unit 515. The correcting circuit 516 may have a construction which includes, using correcting data based on a first region corresponding to the irradiation region in the sensor 501, first processing in which image data based on a second region corresponding to the irradiation region of the sensing region 8 is corrected; and second processing in which image data based on the second region excluding the overlapping part between the first region and the second region is processed. The correcting circuit may have a construction which includes processing in which, using correcting data based on the first region which corresponds to the irradiation region in the sensing region 8 and which is smaller than the sensing region 8, image data based on the second region corresponding to the irradiation region in the sensing region 8 of the sensor 501 is corrected. Alternatively, the correcting circuit 516 have a construction which includes, using correcting data based on the first region corresponding to the irradiation region in the sensing region 8 of the sensor 501, processing in which image data based on the second region corresponding to the irradiation region of the sensing region 8 is corrected; and processing in which, based on the fact that the irradiation region is smaller than the sensing region 8, image data output from the sensing region 8 is corrected. Moreover, the correcting circuit 516 may have a construction which includes a recognizing unit recognizing the irradiation region in the sensing region 8 of the sensor 501, wherein image data based on the second region corresponding to the irradiation region in the sensing region 8 is corrected using correcting data based on the first region corresponding to the irradiation region in the sensing region 8 as well as using the result by the recognizing unit.

An overall x-ray imaging system using the flat panel x-ray sensor 501 and the correcting circuit 507 or 516 described in the first or second embodiment, respectively, is described with reference to FIG. 11.

The x-ray imaging system is arranged in an x-ray room 101, an x-ray control room 102, and an examination room 103. A system control unit 110 controls overall operations of the x-ray imaging system.

A touch panel on a display, a mouse, a keyboard, a joystick, a footswitch, and the like serve as an operator interface 111. Imaging conditions (a still image, a moving image, x-ray tube voltage, x-ray tube current, x-ray irradiating time, and the like), imaging timing, imaging processing conditions, subject ID, a processing method of the captured image, and the like can be set via the operator interface 111. Since most information is transferred from a radiation information system (not shown), there is no need to input each piece of information via the interface 111. Instead, the operator must confirm the captured image. This means that the operator must determine whether the angle of capturing is correct, whether the subject is moved, whether image processing is appropriately performed, and the like.

The system control unit 110 sends imaging conditions based on a request from an operator 105 or the radiation information system to an imaging control unit 214 which controls x-ray imaging sequence, and then the unit 110 acquires data. Based on the request, the imaging control unit 214 drives an x-ray generator 120, a bed 130 for imaging, and an x-ray sensing unit 140 into acquiring image data. The acquired image data is transferred to an image processing unit 10. In the image processing unit 10, image processing in accordance with a request from the operator 105 is applied to the captured image data and the resultant image is shown on a display 160. In addition, image data obtained by performing basic image processing such as offset correction, LOG conversion, and gain correction on the captured image data is stored in an external storage unit 161. In the first embodiment, the image processing unit 10 includes the first correcting coefficient computing unit 502, the second correcting coefficient computing unit 505, and the white correcting unit 506. In the second embodiment, the image processing unit 10 includes the correcting coefficient computing unit 502 and the white correcting unit 515. The external storage unit 161 includes the first correcting coefficient storing unit 503 and the second correcting coefficient storing unit 504 in the first embodiment whereas it includes the correcting coefficient storing unit 503 and the calibration region storing unit 514. The external storage unit 161 stores the basic image, an image processing program, a list of stored images, images for gain correcting, and the like. Thus, the correcting circuit 507 or 516 described in the first or second embodiment, respectively, corresponds to the image processing unit 10 and the external storage unit 161 shown in FIG. 12.

In accordance with a request from the operator 105, the system control unit 110 performs reprocessing on image data, playback, data transfer/data storage via a network, displaying on the display 160 and film printing.

A signal flow is described below.

The x-ray generator 120 includes an x-ray tube 121 and an x-ray diaphragm 123. The imaging control unit 214 causes a high voltage generating power source 124 to drive the x-ray tube 121 into emitting an x-ray beam 125. The imaging control unit 214 also drives the x-ray diaphragm 123 into rectifying the x-ray beam 125 in accordance with changes in imaging regions so that unnecessary x-ray beams are not emitted. The x-ray beam 125 is aimed toward a subject 126 lying on the radiolucent bed 130 for imaging. The bed 130 for imaging is driven in accordance with the imaging control unit 214. The x-ray beam 125 is irradiated on the x-ray sensing unit 140 after the beam 125 transmits through the subject 126 and the bed 130.

The x-ray sensing unit 140 includes a grid 141, a scintillator 142, a photo-sensor array (sensing region) 8, an x-ray exposure monitor 144, and a driving circuit 145. The grid 141 reduces influences due to x-rays scattered by their transmission through the subject 126. The grid 141 includes an x-ray low absorption member and an x-ray high absorption member. For example, the grid 141 has a stripe construction including Al and Pb. When x-rays are irradiated, the grid 141 is vibrated based on the request from the imaging control unit 214 so that moirés is not produced in accordance with the grid ratio between the photo-sensor array 8 and the grid 141. The flat panel x-ray sensor 501 includes in FIG. 1 includes the scintillator 142, the photo-sensor array 8, and the driving circuit 145.

The scintillator 142 causes x-rays having high energy to excite the phosphor material. When these materials are recombined, recombination energy leads to fluorescence in the visible region. Fluorescence is caused by the phosphor material itself such as $CaWO_4$ or $CdWO_4$, or by a luminescent-center material such as CsI:Tl or Zns:Ag added in $CaWO_4$ or $CdWO_4$.

The photo-sensor array 8 is provided in the proximity of the scintillator 142. The photo-sensor array 8 converts a photon to an electrical signal. The x-ray exposure monitor 144 monitors the amount of x-ray exposure. The x-ray exposure monitor 144 may directly sense x-rays using a crystal-silicon photoreceptor or may sense light from the scintillator 142. In this example, an amorphous silicon photoreceptor which is deposited on the rear face of the substrate of the photo-sensor array 8 senses visible light (in proportion to the x-ray amount) transmitting through the photo-sensor array 8. Information on the sensed visible light is sent to the imaging control unit 214. The imaging control unit 214 shuts off or controls x-rays by driving the high-voltage generating power source 124 based on the information. The driving circuit 145 drives the photo-sensor array (flat panel sensor) 8 under the control of the imaging control unit 214 into reading a signal from each pixel.

The image signal from the x-ray sensing unit 140 is transferred from the x-ray room 101 to the image processing unit 10 in the x-ray control room 102. Excessive noise during x-ray generation in the x-ray room 101 may cause some trouble during image data transfer. Therefore, noise-resistibility in a transmission channel must be increased. Desirably, an error correcting function may be provided in the transmission channel. In addition, for example, a twisted pair with a shielded line using a differential driver or an optical fiber may be used as the transmission channel. The image processing unit 10 switches display data based on the request of the imaging control unit 214 (described below). Furthermore, image data correcting (which is performed, in the first embodiment, by the first correcting coefficient computing unit 502, the second correcting coefficient computing unit 504, and the white correcting unit 506, or which is performed, in the second embodiment, by the correcting coefficient computing unit 502 and the white correcting unit 515), space filtering, recursive processing, etc. can be performed in real time. In addition, gradation processing, scattered radiation correcting, various spatial frequency processing, etc. can be performed.

The processed image is displayed on the display 160 via a display adapter 151. The basic image data experiencing only data correction is stored in the external storage unit 161 along with performance of real-time image processing. As the external storage unit 161, a mass storage, high speed, and highly reliable data storing device is desired. For example, a hard disk array such as RAID (Redundant Array of Inexpensive Drives) is desired. In accordance with the request from the operator 105, the image data stored in the external storage unit 161 is transferred to the external storage unit 162. When the image data is stored in the external storage unit 162, it is reconstructed so as to satisfy a predetermined standard such as IS&C. The external storage device 162 includes, for example, a magneto-optical disk 162 or a hard disk of a file server 170 on a LAN (Local Area Network).

The x-ray imaging system can be connected via a LAN board 163 to the LAN. In addition, the x-ray imaging system has data compatibility with an HIS (Hospital Information System). The LAN is connected to not only a plurality of x-ray imaging systems but also a monitor 174 displaying the still image or the moving image, the file server 170 managing image data, an image printer 172 outputting image data onto the film, an image processing terminal 173 performing complicated image processing and diagnostic support, and the like. The x-ray imaging system outputs image data based on a predetermined protocol (for example, DICOM (Digital Imaging and Communications in Medicine)). In addition, during x-ray imaging, a medical doctor can remotely perform real-time diagnosis using a monitor connected to the LAN.

Figure 12:
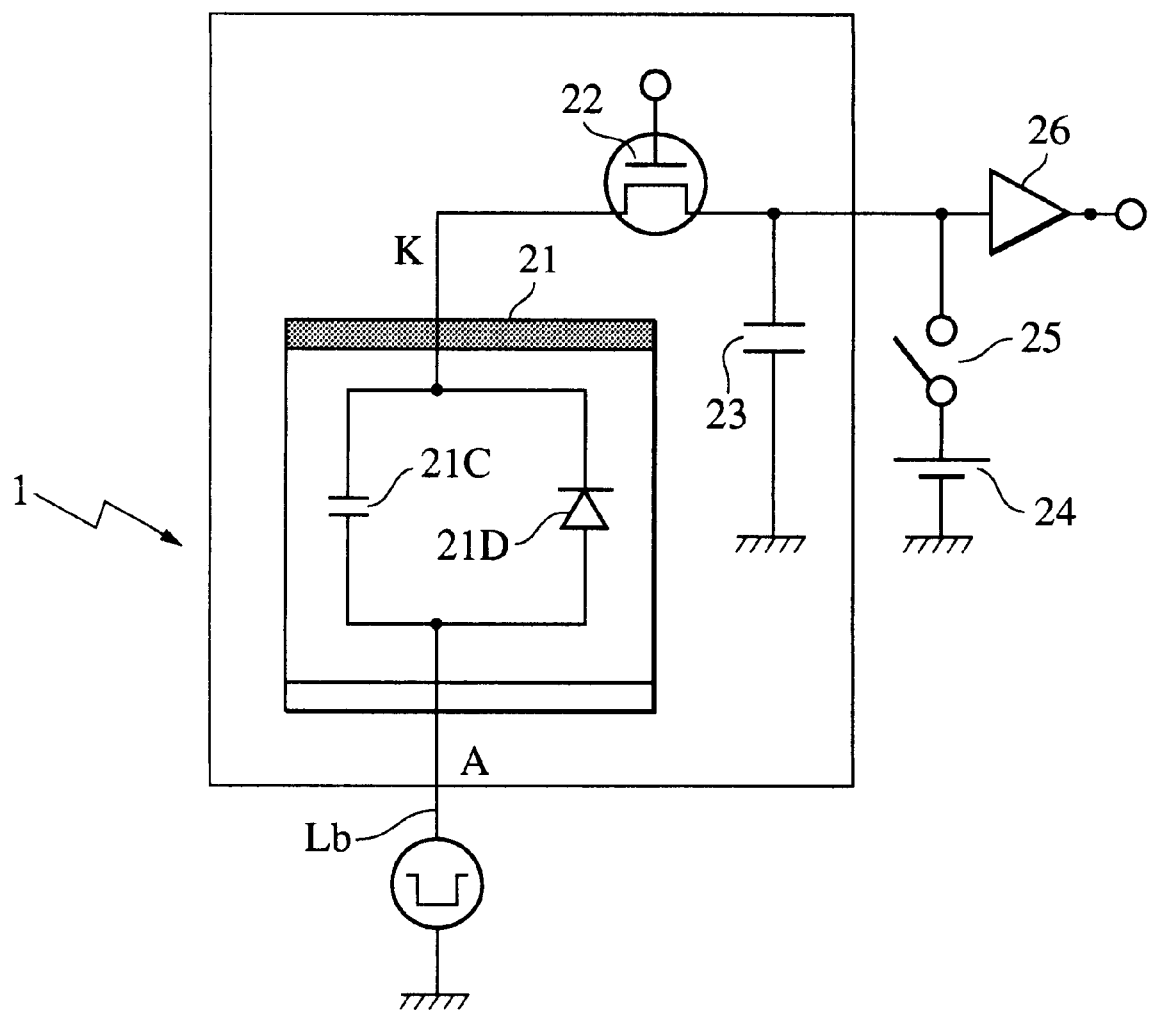
FIG. 12 is a block diagram illustrating a part of the x-ray imaging system shown in FIG. 11.

FIG. 12 shows an example equivalent circuit of the photo-sensor array 8. Although the two-dimensional amorphous silicon sensor is used as an example, the sensing device is not necessarily limited to this. Even though other solid-state image sensing device such as a charge-coupled device or a device such as a photomultiplier is used as the sensing device, the functions and the construction of the A/D (Analog-to-Digital) converter are the same.

Referring back to FIG. 12, one element includes a photoelectric conversion element 21 and a switching TFT (Thin Film Transistor) 22 for controlling storage and read of an electric charge. Generally, the amorphous silicon (α-Si) is formed on a glass substrate. In the photoelectric conversion element 21, element 21C may represent a photo diode having a parasitic capacitor or may represent a photo-sensor having an additional capacitor 21C in parallel so that the dynamic range of a photodiode 21D is improved. The anode A of the diode 21D is connected to a bias line $L_b$, which is a common electrode and the cathode K is connected to a controllable switching TFT 22 reading the electric charge stored in the capacitor 21C. In this example, the switching TFT 22 is a thin film transistor which is connected between the cathode K of the photodiode 21D and a preamplifier 26 reading the electric charge.

The switching TFT 22 and a signal charge operate a reset switching element 25, which resets the capacitor 21C. Subsequently, radiation rays 1 are emitted, whereby the photodiode 21D generates electric charges in accordance with the amount of the radiation rays 1. The generated electric charges are stored in the capacitor 21C. This time, the switching TFT 22 and the signal charge operate the reset switching element 25 so that the electric charge is transferred to a capacitance element 23. The preamplifier 26 reads as an electrical signal the amount of the electric charges stored by the photodiode 21D, and then A/D converting is performed, whereby the amount of incident rays is obtained.

Figure 11:
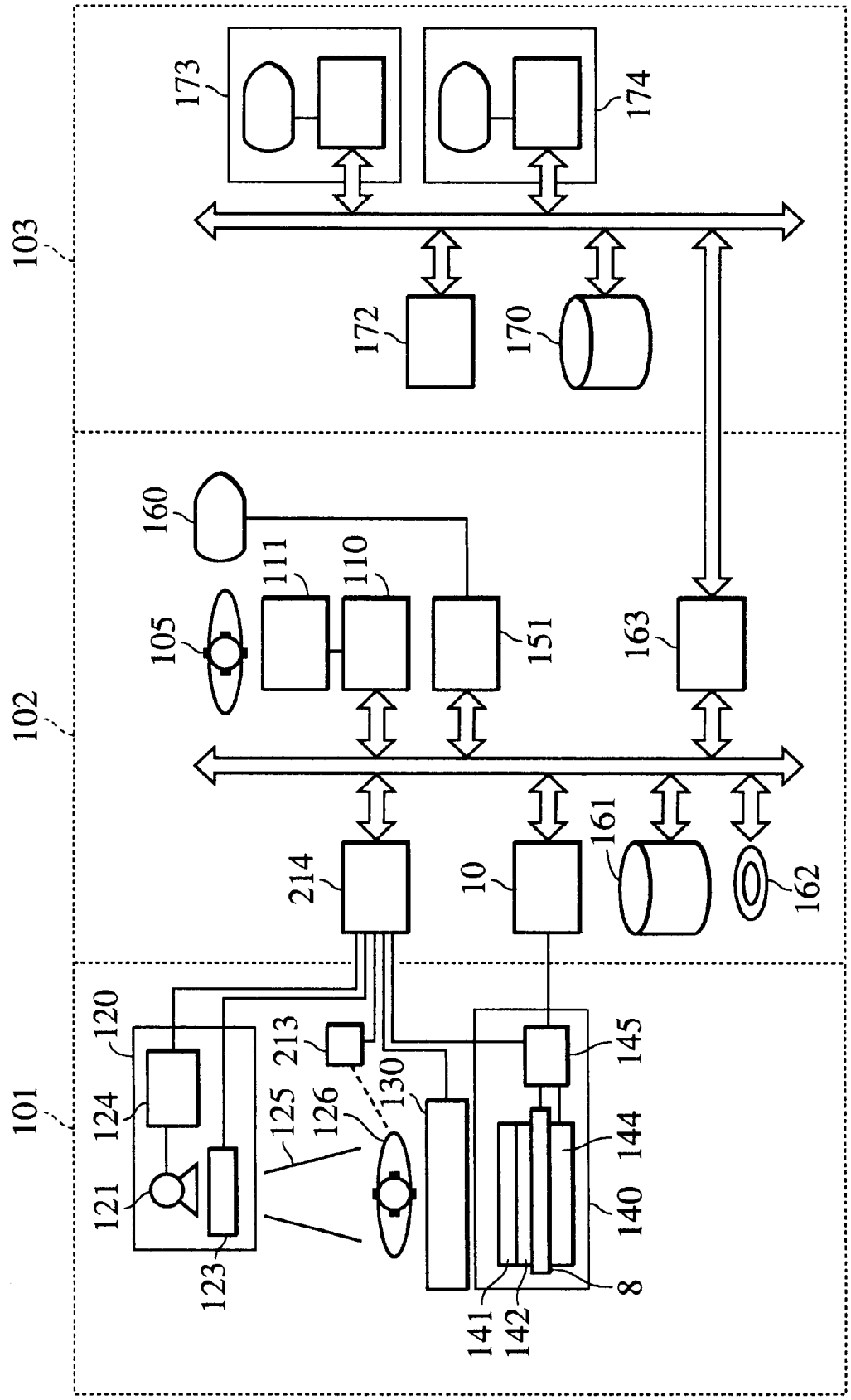
FIG. 11 is a block diagram illustrating an overall x-ray imaging system using a sensing unit and a correcting unit described in the first embodiment and the second embodiment.
Figure 13:
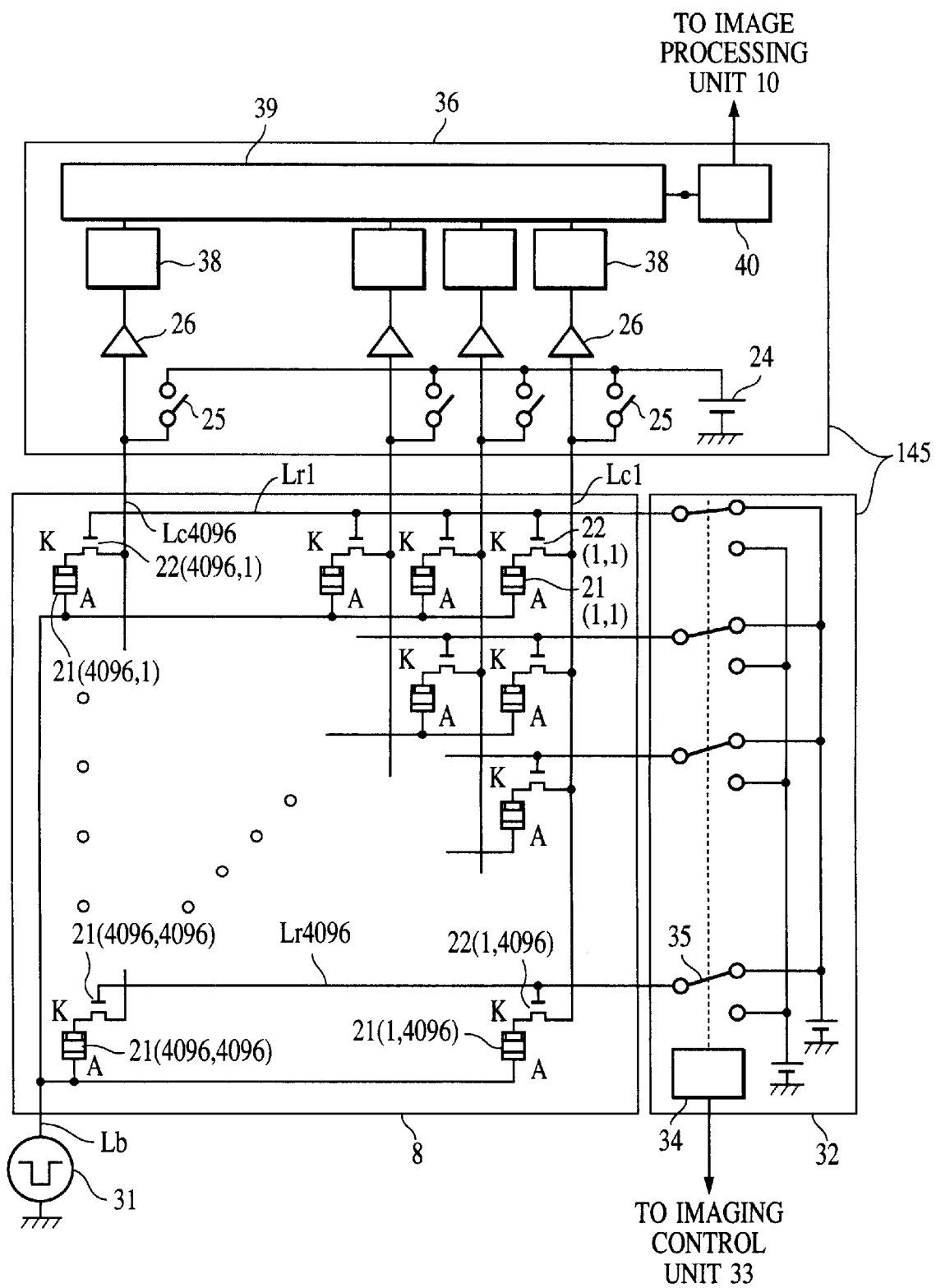
FIG. 13 is a block diagram illustrating a part of the x-ray imaging system shown in FIG. 11.

FIG. 13 shows an equivalent circuit of a photoelectric conversion device (correspond to the photo-sensor array 8 and the driving circuit 145 in FIG. 11). Photoelectric conversion is described in a case in which the photoelectric conversion device is constructed by two-dimensionally expanding photoelectric conversion elements 21 shown in FIG. 12.

The photo-sensor array 8 is constructed having approximately 2000×2000 to 4000×4000 pixels and the area of the array is in the range of approximately 200 mm×200 mm to 500 mm×500 mm. In FIG. 13, the photo-sensor array 8 is constructed having 4096×4096 pixels and the area of the array is 430 mm×430 mm. Hence, the size of one pixel is approximately 105×105 μm. 4096 blocks, each of which has 4096 pixels wired therein so as to be horizontally aligned, are vertically provided, whereby the pixels are two-dimensionally arranged.

In the above example, the photo-sensor array 8 is constructed using a single substrate having 4096×4096 pixels thereon. The photo-sensor array 8 having 4096×4096 pixels may be constructed using four photo sensors each having 2048×2048 pixels. When four photo sensors having 2048×2048 pixels constitute the single photo-sensor array 8, there is a merit such as improvement in product yield due to the fact that photo-sensor arrays 8 are dividedly produced.

As described above, one pixel includes the photoelectric conversion element 21 and the switching TFT 22. As shown in FIG. 13, 21(1, 1) to 21(4096, 4096) each correspond to the photoelectric conversion element 21 in which "K" represents a cathode side and "A" represents an anode side. 22(1, 1) to 22(4096, 4096) each represent the switching TFT 22.

The cathodes of the photoelectric conversion elements 21(m, n) of each column of the two-dimensional photo-sensor array 8 are connected to the corresponding common column signal lines Lc1 to Lc4096 via the conduction paths from the sources to the drains of the corresponding switching TFT 22(m, n). For example, the photoelectric conversion elements 21(1, 1) to 21(1, 4096) of column 1 are connected to the column signal line Lc1. The anodes of the photoelectric conversion elements 21(m, n) of each row are commonly connected via the bias line Lb to a bias power source 31 for operating the above modes. The gates of the switching TFTs 22 of each row are connected to the corresponding row selector lines Lr1 to Lr4096. For example, the switching TFTs 22(1, 1) to 22(4096, 1) of row 1 are connected to the row selector line Lr1. The row selector lines Lr1 to Lr4096 are connected to the imaging control unit 33 via a line selector unit 32. The line selector unit 32 includes, for example, an address decoder 34 and 4096 switching elements 35. This construction allows an arbitrary line Lrn to be read. When the line selector unit 32 having the simplest construction is desired, it can be constructed using only a shift register which is used in a liquid crystal display or the like.

The column signal lines Lc1 to Lc4096 are connected to a signal reading unit 36 which is controlled by the imaging control unit 33. The signal reading unit 36 includes switches 25 for resetting the corresponding column signal lines Lcn to the reference voltage of a reset reference power source 24, preamplifiers 26 for amplifying a signal, sample-and-hold circuits 38, an analog multiplexer 39, and an A/D converter 40. The preamplifiers 26 amplify the corresponding signals from the column signal lines Lcn. The sample-and-hold circuits 38 hold the signals from the corresponding preamplifiers 26. The analog multiplexer 39 sequentially outputs the signals from the sample-and-hold circuits 38 to the A/D converter 40. The A/D converter 40 converts the output from the analog multiplexer 39 into the digital data and outputs it to the image processing unit 10.

The photoelectric conversion device is constructed in which 4096×4096 pixels are divided into 4096 column signal lines Lcn. The outputs of the 4096 pixels of one row are simultaneously transferred to the analog multiplexer 39 via the corresponding column signal lines Lc, the corresponding preamplifiers 26, and the corresponding sample-and-hold circuits 38. The analog multiplexer 39 sequentially outputs data to the A/D converter 40.

In FIG. 13, the A/D converter 40 seems to be constructed in a single block. Actually, in the A/D converter 40, 4 to 32 systems thereof simultaneously perform A/D converting. This is because the image signal is required to be read as soon as possible without causing the A/D converting rate of the analog signal band to be unnecessarily increased.

There is a close relationship between storing time and A/D converting time. When fast A/D converting is performed, since the band of the analog circuit is widened, it is difficult to achieve a desired S/N (Signal-to-Noise ratio). Accordingly, the image signal is required to be read as soon as possible without causing the A/D converting speed to be unnecessarily increased. This is realized by performing A/D conversion using many A/D converters 40, which increases costs. Therefore, in view of the foregoing points, the appropriate values concerning the A/D converter 40 must be selected.

Since the irradiating time of the radiation ray 1 is approximately in the range of 10 to 50 msec, it is appropriate that the acquiring time of the entire image data or the storing time of the electric charges is set to the order of 100 msec or slightly below.

For example, in order to acquire the image data in 100 msec by sequentially driving the entire pixels of the image data, when A/D converting is performed at 10 MHz sampling rate and when the analog signal band is set to approximately 50 MHz, at least four systems of the A/D converters 40 are required. In the present imaging system, 16 systems of the A/D converters 40 simultaneously perform A/D converting. The 16 systems of the A/D converters 40 output converted data to 16 systems of memories such as FIFOs (First-In First-Out) (not shown). By selectively switching to the corresponding memory, image data corresponding to one consecutive scanning line is transferred to the image processing unit 10. Finally, the image data is shown as an image or a graph on the display or the like.

(Other Embodiment)

The present invention is achieved by providing a storage medium having a software program code for realizing functions described in the above embodiments and by causing the system or a computer (CPU or MPU) of the system to read and execute the program code.

In this case, the program code itself, which is read from the storage medium, realizes novel functions of the present invention. Therefore, the storage medium having the program code becomes a necessary component of the present invention.

As the storage medium, for example, a floppy disk, a hard disk, an optical disk, a magneto-optical disk, a CD-ROM (Compact Disc Read-Only Memory), a CD-R (Compact Disc Recordable), a magnetic tape, a nonvolatile memory card, and a ROM (Read only Memory) may be used.

By causing the computer to read and execute the program code, functions of the above-described embodiments are realized. In addition, by causing an OS (Operating System) running on the computer to perform a part of or the entirety of actual processing in accordance with the program code, functions of the above-described embodiments may be realized.

Alternatively, by loading the program code read from the storage medium into an expansion board plugged in the computer or a memory of an expansion unit connected to the computer, and then by causing the expansion board or a CPU of the expansion unit to perform a part of or the entirety of actual processing in accordance with the program code, functions of the above-described embodiments may be realized.

The present invention can apply to a case in which the software program code, stored in the storage medium, for realizing functions of the above-described embodiments is distributed to a requester via a channel for personal computer communications or the like.

What is claimed is:

1. An image processing apparatus comprising:
    a sensor including a sensing region which senses an image of an object; and
    a correcting circuit which performs:
        first processing which corrects image data based on a second region corresponding to an irradiation region in said sensing region by using correcting data based on a first region corresponding to an irradiation region in said sensing region; and
        second processing which performs processing on said image data based on a third region included in said second region, and excluded in an overlapping part between said first region and said second region.

2. An image processing apparatus according to claim 1, wherein said second processing corrects image data based on said third region using different correcting data from said correcting data used in said first processing.

3. An image processing apparatus according to claim 1, wherein said correcting circuit includes third processing which generates correcting data obtained by combining correcting data based on said first region and correcting data based on a region corresponding to the irradiation region in said sensing region excluding said first region, wherein said first processing and said second processing are performed using the correcting data generated by said third processing.

4. An image processing apparatus according to claim 1, wherein said second processing is performed so that image data based on said third region is not displayed.

5. An image processing apparatus according to claim 4, wherein said second processing is performed so that information on said third region is displayed.

6. An image processing apparatus according to claim 5, wherein said information includes the outline of said second region.

7. An image processing apparatus comprising:
    a sensor including a sensing region for sensing an image of an object; and
    a correcting circuit which corrects image data from said sensing region by using correcting image data obtained by combining first correcting image data and second correcting image data from said sensing region, wherein said first correcting image data is obtained by irradiating a first region in said sensing region, and said second correcting image data is obtained by irradiating a second region which is smaller than said first region in said sensing region, and wherein the irradiating for obtaining said first correcting image data is performed at a different timing than is the irradiating performed for obtaining said second correcting image data,
    wherein the number of times that second correcting image data is obtained, is larger than the number of times said first correcting image data is obtained, and common first correcting image data is used with a plurality of second correcting image data.

8. An image processing apparatus according to claim 7, wherein said correcting circuit includes a first correcting coefficient computing unit which computes a first correcting coefficient based on said first correcting image data, a first correcting coefficient storing unit which stores said first correcting coefficient, a second storing correcting coefficient storing unit which stores a second correcting coefficient based on said second correcting image data computed by said first correcting coefficient computing unit by using said second correcting image data, and a second correcting coefficient computing unit which computes a third correcting coefficient based on said first correcting coefficient and said second correcting coefficient.

9. An image data correcting method for correcting image data output from a sensor including a sensing region which senses an image of an object, said image data correcting method comprising:
    correcting image data based on a second region corresponding to an irradiation region in said sensing region by using correcting data based on a first region corresponding to an irradiation region in said sensing region; and
    performing image processing on said image data based on a region included in said second region and excluded in an overlapping part between said first region and said second region.

10. An image data correcting method for correcting image data output from a sensor including a sensing region which senses an image of an object, said image data correcting method comprising:
    correcting image data from said sensing region by using correcting image data obtained by combining first correcting image data and second correcting image data from said sensing region, wherein said first correcting image data is obtained by irradiating a first region in said sensing region, and said second correcting image data is obtained by irradiating a second region which is smaller than said first region in said sensing region, and wherein the irradiating for obtaining said first correcting image data is performed at a different timing than that at which the irradiating for obtaining said second correcting image data is performed, wherein the number of times that second correcting image data is obtained, is larger than the number of times said first correcting image data is obtained, and common first correcting image data is used with a plurality of second correcting image data.

11. A computer-readable storage medium containing a program for correcting image data output from a sensor including a sensing region which senses an image of an object, said program comprising:

a first correcting code which corrects image data based on a second region corresponding to an irradiation region in said sensing region by using correcting data based on a first region corresponding to an irradiation region in said sensing region; and a second correcting code which performs image processing on said image data based on a region included in said second region, and excluded in an overlapping part between said first region and said second region.

12. A computer-readable storage medium containing a program for correcting image data output from a sensor including a sensing region which senses an image of an object, said program comprising:

a code which corrects image data from said sensing region by using correcting image data obtained by combining first correcting image data and second correcting image data from said sensing region, wherein said first correcting image data is obtained by irradiating a first region in said sensing region, and said second correcting image data is obtained by irradiating a second region which is smaller than said first region in said sensing region, and wherein the irradiating for obtaining said first correcting image data is performed at a different timing than that at which the irradiating for obtaining said second correcting image data is performed, wherein the number of times that second correcting image data is obtained, is larger than the number of times said first correcting image data is obtained, and common first correcting image data is used with a plurality of second correcting image data.

13. An image processing apparatus comprising:

an image sensor having an image sensing region which senses image data indicative of irradiation of an object placed on the image sensing region;

a first correcting unit which generates first correcting data based on irradiating the entire image sensing region of said image sensor, and which generates second correcting data based on irradiating less than the entire image sensing region of said image sensor;

a second correcting unit which generates third correcting data by combining the first correcting data and the second correcting data; and a third correcting unit which corrects the image data indicative of an irradiated object sensed by said image sensor by using the third correcting data, wherein the irradiating for obtaining the first correcting data is performed at a different timing than that at which the irradiating for obtaining the second correcting data is performed, and wherein the data in the central region of the third correcting data is made based on the first correcting data, and the data in the peripheral region of the third correcting data is made based on the second correcting data.

14. An image processing apparatus comprising:

an image sensor having an image sensing region which senses image data indicative of irradiation of an object placed on the image sensing region, with the image sensing region including a calibration region and an image capture region, with the calibration region being smaller in size than the image sensing region, and the image capture region being less than or equal in size to the image sensing region, with the calibration region and the image capture region overlapping each other;

a first correcting unit which generates correcting data based on irradiating the calibration region of the image sensing region, and generates calibration region data indicative of the location of the calibration region in the image sensing region; and a second correcting unit which determines an overlapping part between the calibration region and the image capture region based on the calibration data and the sensed image data in the image capture region, and corrects the sensed image data in the overlapping part based on the correcting data.

15. An image data correcting method for correcting image data output from an image sensor having an image sensing region which senses image data indicative of irradiation of an object placed on the image sensing region, said image data correcting method comprising:

generating first correcting data based on irradiating the entire image sensing region of said image sensor, and generating second correcting data based on irradiating less than the entire image sensing region of said image sensor;

generating third correcting data by combining the first correcting data and the second correcting data; and correcting the image data indicative of an irradiated object sensed by said image sensor by using the third correcting data, wherein the irradiating for obtaining the first correcting data is performed at a different timing than that at which the irradiating for obtaining the second correcting data is performed, and wherein the data in the central region of the third correcting data is made based on the first correcting data, and the data in the peripheral region of the third correcting data is made based on the second correcting data.

16. An image data correcting method for correcting image data output from an image sensor having an image sensing region which senses image data indicative of irradiation of an object placed on the image sensing region, with the image sensing region including a calibration region and an image capture region, with the calibration region being smaller in size than the image sensing region, and the image capture region being less than or equal in size to the image sensing region, with the calibration region and the image capture region overlapping each other, said image data correcting method comprising:

generating correcting data based on irradiating the calibration region of the image sensing region, and generating calibration region data indicative of the location of the calibration region in the image sensing region; and determining an overlapping part between the calibration region and the image capture region based on the calibration data and the sensed image data in the image capture region, and correcting the sensed image data in the overlapping part based on the correcting data.

17. A computer-readable storage medium containing a program for correcting image data output from an image sensor having an image sensing region which senses image data indicative of irradiation of an object placed on the image sensing region, said program comprising:

- a first correcting code which generates first correcting data based on irradiating the entire image sensing region of said image sensor, and which generates second correcting data based on irradiating less than the entire image sensing region of said image sensor;
- a second correcting code which generates third correcting data by combining the first correcting data and the second correcting data; and
- a third correcting code which corrects the image data indicative of an irradiated object sensed by said image sensor by using the third correcting data,
- wherein the irradiating for obtaining the first correcting data is performed at a different timing than that at which the irradiating for obtaining the second correcting data is performed, and wherein the data in the central region of the third correcting data is made based on the first correcting data, and the data in the peripheral region of the third correcting data is made based on the second correcting data.

18. A computer-readable storage medium containing a program for correcting image data output from an image sensor having an image sensing region which senses image data indicative of irradiation of an object placed on the image sensing region, with the image sensing region including a calibration region and an image capture region, with the calibration region being smaller in size than the image sensing region, and the image capture region being less than or equal in size to the image sensing region, with the calibration region and the image capture region overlapping each other, said program comprising:

- a first correcting code which generates correcting data based on irradiating the calibration region of the sensing region, and generates calibration region data indicative of the location of the calibration region in the image sensing region; and
- a second correcting code which determines an overlapping part between the calibration region and the image capture region based on the calibration data and the sensed image data in the image capture region, and corrects the sensed image data in the overlapping part based on the correcting data.

19. An image processing apparatus comprising:

- an image sensor having an image sensing region which senses image data indicative of irradiation of an object placed on the image sensing region;
- a first correcting unit which corrects image data based on a second region corresponding to an irradiation region in said sensing region by using correcting data based on a first region corresponding to an irradiation region in said sensing region; and
- a second correcting unit which performs processing on said image data based on a third region included in said second region, and excluded in an overlapping part between said first region and said second region.

* * * * *